US006549786B2

United States Patent
Cheung et al.

(10) Patent No.: US 6,549,786 B2
(45) Date of Patent: *Apr. 15, 2003

(54) METHOD AND APPARATUS FOR CONNECTING A WIRELESS LAN TO A WIRED LAN

(75) Inventors: Roger Y. M. Cheung, Scarborough (CA); Peter E. Reissner, Belleville (CA); Danny N. McKay, Toronto (CA)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/082,910

(22) Filed: May 25, 1998

(65) Prior Publication Data

US 2002/0141368 A1 Oct. 3, 2002

Related U.S. Application Data

(63) Continuation of application No. 08/506,151, filed on Jul. 24, 1995, now Pat. No. 5,901,362.

(30) Foreign Application Priority Data

Jul. 29, 1994 (CA) .............................................. 2129197

(51) Int. Cl.⁷ ................................................ H04Q 7/20
(52) U.S. Cl. ...................... 455/524; 455/517; 370/338; 370/401
(58) Field of Search ................................ 455/525, 517, 455/524, 5, 435, 466, 7, 11.1, 14, 15, 16; 370/338, 401, 254, 349, 445, 461, 462

(56) References Cited

U.S. PATENT DOCUMENTS

| | | | | |
|---|---|---|---|---|
| 5,276,680 A | * | 1/1994 | Messenger | 455/517 X |
| 5,339,316 A | * | 8/1994 | Diepstraten | 370/401 |
| 5,546,540 A | * | 8/1996 | White | 370/254 X |
| 5,594,731 A | * | 1/1997 | Reissner | 370/338 |
| 5,636,220 A | * | 6/1997 | Vook et al. | 370/338 |
| 5,748,619 A | * | 5/1998 | Meier | 370/338 X |
| 5,901,362 A | * | 5/1999 | Cheung et al. | 370/349 X |

FOREIGN PATENT DOCUMENTS

| | | | |
|---|---|---|---|
| EP | 0483544 | 10/1991 | H04Q/7/04 |
| WO | 9219059 | 10/1992 | H04L/12/56 |

* cited by examiner

*Primary Examiner*—William Trost
*Assistant Examiner*—Philip J. Sobutka
(74) *Attorney, Agent, or Firm*—Joscelyn G. Cockburn

(57) ABSTRACT

An internetworking node for providing internetworking services for mobile wireless nodes is disclosed. Each mobile wireless node is associated with at the most one internetworking node. Each mobile wireless node selects which internetworking node it will associate with. The internetworking node will then act for all wireless nodes associated to it in relaying messages between wireless nodes or between a wired lane and the wireless nodes.

16 Claims, 11 Drawing Sheets

METHOD AND APPARATUS FOR CONNECTING A WIRELESS LAN TO A WIRED LAN

CROSS-REFERENCE TO RELATED APPLICATIONS

This application is a continuation of application Ser. No. 08/506,151, filed Jul. 24, 1995, now U.S. Pat. No. 5,901,362 issued May 4, 1999.

This patent application is related to the applications titled, ACCESS POINT FOR MOBILE WIRELESS NETWORK NODE U.S. Pat. No. 5,654,959 issued Aug. 5, 1997, Ser. No. 08/506,273, and ACCESS POINT TRACKING FOR MOBILE WIRELESS NETWORK NODE, U.S. Pat. No. 5,594,731 issued Jan. 14, 1997, Ser. No. 08/506,411 both filed Jul. 24, 1995, the disclosures of which are hereby incorporated by reference.

FIELD OF THE INVENTION

This invention pertains to wireless networks generally, and means for connecting wireless nodes or wireless LANs to wired LANs in particular.

BACKGROUND OF THE INVENTION

Local Area Networks (LANs) have historically consisted of nodes interconnected by physical telecommunications media (eg, coaxial cable, twisted pair wire, or fiber optics). We shall refer to such LANs as wired LANs.

Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter (which includes a transmitter/receiver and control card), such as an IR wireless Adapter, the mobile nodes can move around and remain connected to the network, provided they do not move out of range.

One method of implementing a wireless LAN is similar to a cellular phone network system. In this method wireless nodes do not communicate directly with each other, but rather send all signals to a central base station, which then redirects the signals to the destination node.

However, in certain situations, it is advantageous to allow each wireless node to communicate directly with other nodes, as is the case in most wired LANs. In a wireless LAN which permits this, the wireless adapter and controlling software transmit data packets which all nodes within range can hear. This permits transmitting of packets which are received but ignored by all nodes except the one(s) to which they are addressed. This parallels the packet delivery systems of such wired LAN protocols as Ethernet. Thus, upper level network operating system software, which relies on a packet delivery system such as Novell Corporation's NETWARE (tm) can be used with such a wireless LAN. We shall refer to such a wireless LAN as a Peer-to-Peer Wireless LAN.

There is an important physical characteristic in a peer-to-peer wireless LAN that makes it very difficult to build a reliable network compared to a wired LAN. In a wired LAN, every network node is physically connected to the network and can therefore access all of the network traffic. This is often not the case with wireless LANs. Each node communicates with other nodes by means of some form of electromagnetic signal, the range of which will be limited. Each node will have an area of coverage which will be limited by such factors as type of signal, signal strength, obstacles within range, etc. In the wireless LAN, it cannot be guaranteed that every network node, which is presumably part of the same wireless network, can listen to all the network traffic. For example, if nodes A, B, and C are connected to the same wireless network, A may be able to listen to the network data sent by B but not by C. In this case, C is a "hidden node" with respect to A. If C can listen to B but not to A, then A is a hidden node with respect to C.

For proper functionality, it is desirable that a wireless LAN should also be able to connect to a wired LAN. In wireless LANs using a base station approach, the Base Station can provide such connectivity. However, there exists a need for system which can provide internetworking services between a peer-to-peer wireless LAN and a wired LAN.

There are several problems associated with a wireless LAN which complicate the implementation of a simple bridge as a means for connecting a wireless LAN to a wired LAN. The primary function of such a device would be to resend overheard wireless LAN network data that is destined for a wired node onto the wired LAN, and vice versa. Depending on the wireless medium chosen, each such device would normally have a limited range. In order to provide adequate coverage, a plurality of devices, each having some degree of overlapping area is necessary. This would normally result in the duplication of messages received by nodes within the overlapping areas, and also on the wired LAN for messages originating from such nodes.

There exists a need for a system which solves these and related problems.

In this specification, the following terms are used:

By internetworking services, we refer to services which allow systems to communicate which could not otherwise. Typical internetworking services include relaying messages from one wireless node to another, resending messages from a wired LAN to a wireless node and resending messages from a wireless node to a wired LAN.

The internetworking node that provides such internetworking services is called an Access Point or AP. The AP is a physical device, which, in order to perform the full range of internetworking services has a wired network adapter as well as a wireless network adapter.

The physical area that a wireless node must be within to be within range of the AP is called the AP's Basic Service Area (BSA). If a wireless node is located within the BSA of a particular AP, that wireless node will be able to receive transmissions sent by that AP.

Each wireless node also has a limited range within which it can communicate. This range is called the Dynamic Service Area (DSA) of the wireless node in this specification. Other nodes within an wireless node's DSA will normally be able to receive transmissions from the wireless node.

If the wireless nodes use the same adapter as the APs, then, all other things being equal, the wireless nodes will have the same range as the APs. However there can be differences between the BSA range of the AP and the DSA range of a wireless node. For one thing, the wireless nodes are usually movable. Thus their range is likely to change, depending on how their signals are affected by obstacles as they move. Also, access points, being physically connected to a wired LAN, are also connected to a supply of power. Thus, the transmitter used in an AP can be more powerful than the battery powered transmitters of the wireless nodes. If this is the case, the BSA range of an access point would normally be larger than the DSA range of a wireless node.

In this specification, we will distinguish between the BSA of an AP and the DSA of a wireless node, even if the two ranges are the same. In this specification, one wireless node is said to be able to "hear" a second wireless node if it is within the DSA of the second node, so that signals sent by the second node can be received by it. Similarly, a wireless node can "hear" an AP if it is within the BSA of the AP, and an AP can "hear" a wireless node if the AP is within the DSA of that node.

A "multicast" message is a form of broadcast message, sent by a wired or wireless node, which is addressed to other nodes having the same specific group address. All other wired or wireless nodes will ignore that message.

SUMMARY OF THE INVENTION

The invention provides a method and a means for providing internetworking services to wireless nodes. The invention provides for an internetworking node which can either directly relay a message from one wireless node to another wireless node, or forward such messages indirectly by first resending them to another such internetworking node which in turn resends the message to the other wireless node. The internetworking devices themselves can communicate through the wireless medium. Preferably, such internetworking devices are interconnected by means of a wired LAN.

From a user's point of view, the invention makes such wireless nodes, as for example from a wireless LAN, and a wired LAN appear as a single logical LAN. The invention allows for integration of wireless nodes with existing wired LAN based network operating systems and network applications, by making each wireless node appear as wired network nodes to other wired network nodes when a wireless node sends data packets to a wired network node. Similarly, where a wireless node is part of a wireless LAN, the invention makes a wired network node appears as a wireless node to other wireless nodes when the wired network node sends data packets to the wireless node.

The invention provides a method and means for using one or more APs as internetworking devices which interconnect a wired LAN and wireless nodes within range of each AP, and for determining when each AP should act to transmit data between the wired LAN and wireless nodes.

The primary functions for each AP are, when appropriate, i) to resend data packets from a wireless node onto the wired LAN if the data packets cannot otherwise reach their destination (eg, if they are destined for a wired node, or are destined for a wireless node outside of the DSA of the sending node); and ii) to resend data packets, which are addressed to a wireless node, from the wired LAN to the wireless node. In the preferred embodiment, the wireless node is part of a wireless LAN. The AP, having both a wired network adapter as well as a wireless network adapter, can communicate using both the packet delivery system of the wired medium, as well as the packet delivery system of the wireless medium. Furthermore, the AP is able to convert a data packet from one system to the other.

Preferably, the APs will also redirect information between two wireless nodes which are both within the AP's range, but are hidden to each other. The invention allows for this even if the AP is not connected to a wired LAN.

To achieve these functions each AP has to know whether the data packets are for a destination within its own BSA, and whether it is responsible for acting. The wireless nodes use a process of association with at most one of the APs to carry out these functions. Each wireless node within range of at least one AP will associate itself with a single AP, even if it is within range of more than one AP. Once a wireless node associates itself with an AP, it will use that AP, and only that AP, to forward data to and from the wireless node. The AP keeps track of which nodes are associated with it, in order to determine whether it is responsible for acting.

Each wireless node monitors the wireless network traffic, and keeps track of which nodes are within its range, ie, which other wireless nodes it has overheard recently. According to the invention, each wireless node uses this information to determine which wireless nodes, including APs, are within its range.

Preferably, each AP broadcasts information about itself at regular intervals. In the preferred embodiment, this broadcast is in the form of a beacon identifying its network address. Each wireless node can determine, from either the AP's regular data transmissions, or from this beacon, whether it is within the AP's BSA. The wireless node keeps track of APs it has overheard. Preferably the node maintains a table of APs it has overheard recently.

If the wireless node overhears data packets (either normal traffic or a beacon) from an AP, it can attempt to associate with the AP by sending an association request to the AP. If a wireless node's association request fails, it will preferably attempt to associate with another AP currently in its AP table. If the wireless node overhears more than one AP, or there is more than one AP in its table, the wireless node determines which AP it will select. In one embodiment, the mobile node selects the AP it has heard most recently.

When a wireless node (the sending node) needs to send a data packet to a particular node (destination node), it first checks to see if it has recently overheard the destination node (implying the destination is within range). Optionally, each wireless node can emit a beacon to assist the other nodes in this.

If the destination node is within range, the sending node transmits the data packet directly to the destination node. If the sending node has not recently overheard the destination node, the sending node checks to see whether it is associated with an AP. Assuming the sending node is associated with an AP, the node transmits the packet to the AP and asks the AP to forward the data packet to its destination.

Once an AP has received a request from a sending node, which it is associated with, to forward a data packet, the AP will check to see if the destination node is also associated with this AP. If so, the AP will transmit the data packet directly to the destination node. If not, the AP will resend the data packet, which is still addressed to the destination node, onto the wired network.

Whenever an AP overhears a directed packet on the wired LAN addressed to a wireless node, the AP checks to see if that node is associated with it. If so, the AP will forward the data packet to the node. Otherwise, the AP will ignore the packet. Similarly, whenever an AP overhears a broadcast packet on the wired LAN, it retransmits the packet to all wireless nodes associated with it.

Thus, in the preferred embodiment, each wireless node actively selects which AP it is associated with, and determines whether it needs an AP's help to send messages. Each AP keeps track of which wireless nodes are associated with it, and automatically relays data packets addressed to associated nodes which the AP has received, either from the wired LAN, or from another associated wireless node.

A broad aspect of the invention provides for a node for communication in a network, comprising wireless network adapter means for sending data by wireless communication to other nodes in the network and receiving data by wireless communication from such nodes, monitoring means for monitoring data which are received by said wireless adapter means, to extract from said data identifying information which identifies the other network nodes whose data are received, and storage means for storing the identifying information.

Another broad aspect of the invention provides for a method for communication in a network, comprising sending data by wireless communication from a first node in the network to other nodes in the network and receiving data by wireless communication from such nodes, monitoring data which are received to extract from said data identifying information which identifies the other network nodes whose data are received, and storing the identifying information.

These foregoing aspects of the invention, together with other aspects and advantages thereof will be more apparent from the following description of the preferred embodiments thereof, taken in conjunction with the following drawings.

DETAILED DESCRIPTION OF THE PREFERRED EMBODIMENT

The preferred embodiment is discussed and illustrated with respect to an example of its implementation using Infra-red (IR) wireless LANs and Ethernet wired LANs. It should be appreciated that the invention is not limited to IR wireless LANs or Ethernet wired LANs and could be similarly implemented in other wireless LANs and/or wired LANs.

Figure 1:
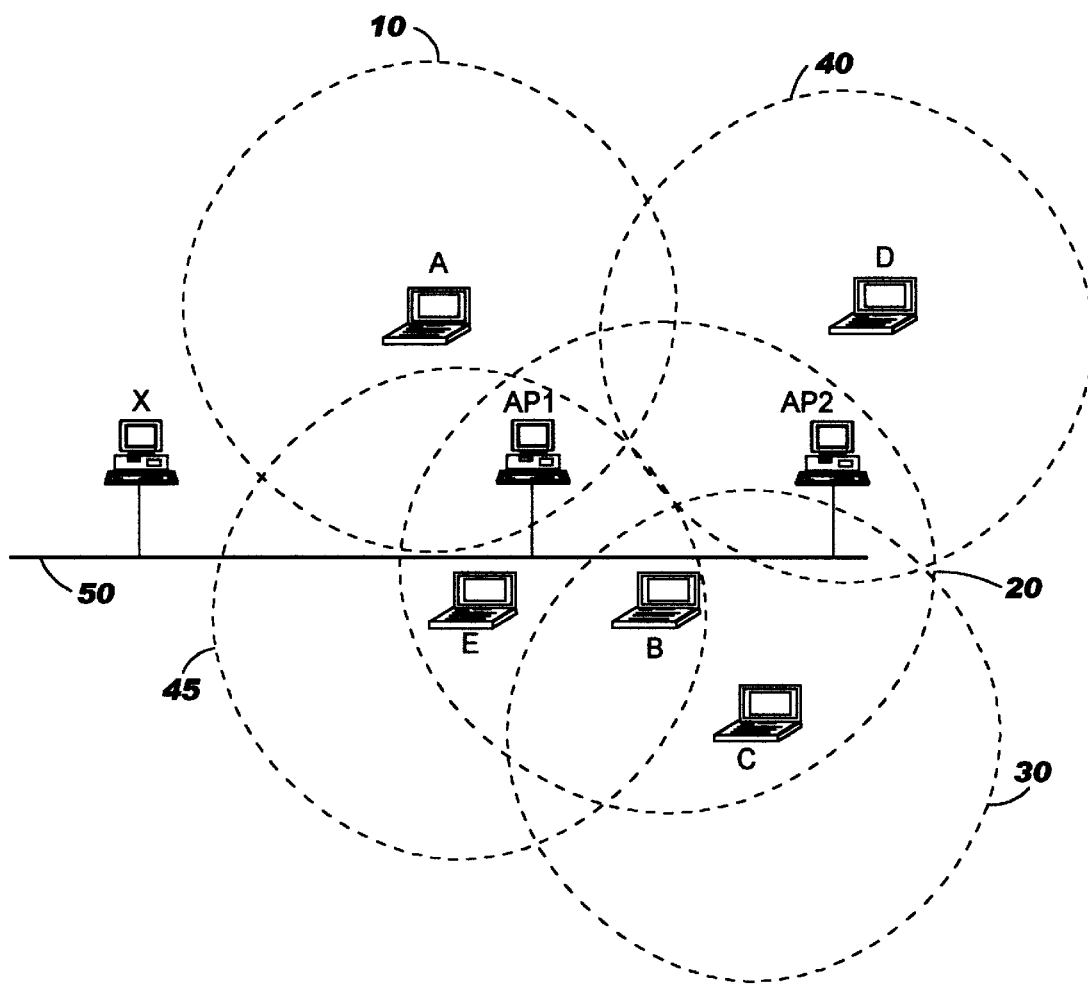
FIG. 1 schematically illustrates a configuration of wireless nodes around a wired LAN, with two APs acting as internetworking nodes, with the DSA of each wireless node shown in phantom.
Figure 2:
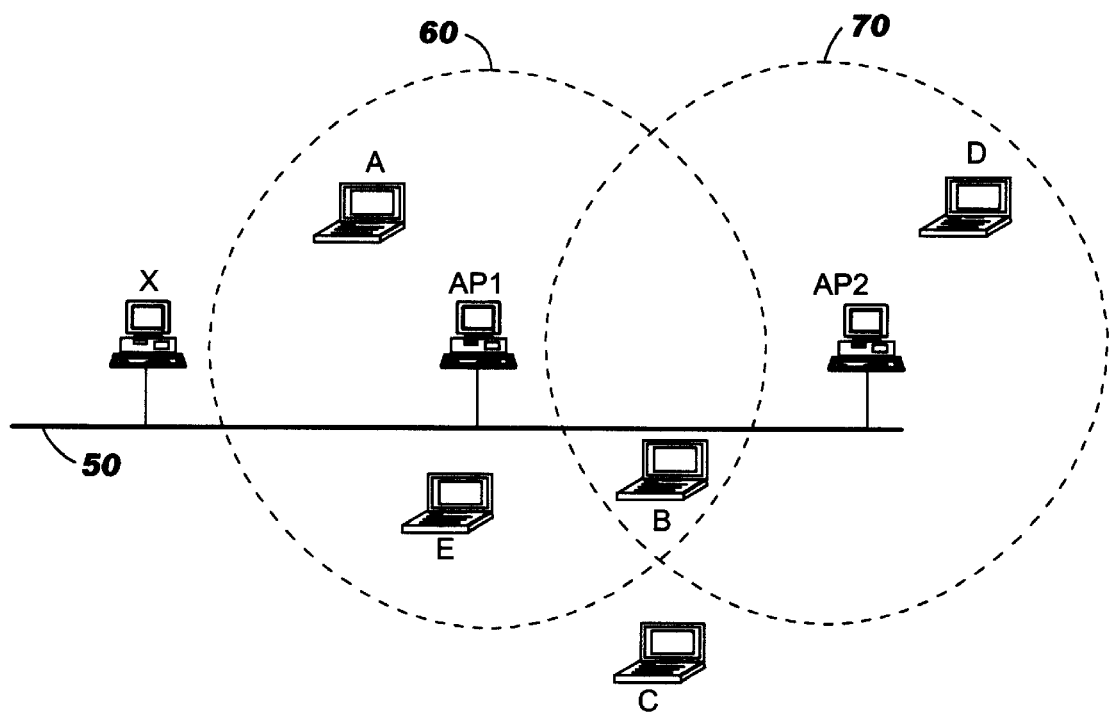
FIG. 2 illustrates schematically the same configuration as is shown in FIG. 1, but with the BSA of each AP shown in phantom.

FIG. 1 and FIG. 2 each illustrate a configuration of wireless nodes A, B, C, D and E, a wired LAN 50, wired node X and APs AP1 and AP2. Each AP is a physical device that has a wired network adapter as well as a wireless network adapter. Each AP understands both the wired LAN and wireless LAN protocols.

In the preferred embodiment, using ISO/CCITT OSI international standard terminology, the AP behaves as a layer 2 Data Link Layer entity that "bridges" between the wireless LAN and the wired LAN. It resends the data traffic from the wireless LAN to the wired LAN in such a way that the data traffic appears to nodes of the wired LAN to have come from wired network nodes in the wired LAN. It also resends the data traffic from the wired LAN to the wireless LAN in such a way that the data traffic appears to the wireless nodes of the wireless LAN to have come from wireless nodes in the wireless LAN. Thus, each AP functions as a transparent MAC-bridge (wherein MAC stands for Medium Access Control, as is known in the art) that connects the IR wireless nodes to the ethernet wired LAN.

In the examples illustrated in drawings, the same wireless adapter is used for both the APs and the wireless nodes. Therefore the BSA range of the APs, ignoring the effect of obstacles, will be the same as the DSA ranges for the wireless nodes. As stated earlier, the AP, being connected physically to a power supply, could support a more powerful transmitter, with an extended BSA range.

FIGS. 1 and 2 are the same except that FIG. 1 illustrates the DSA ranges of the wireless nodes while FIG. 2 illustrates the BSA ranges of the APs. In FIG. 1, wireless node A has a DSA 10, wireless node B has a DSA 20, wireless node C has a DSA 30, wireless node D has a DSA 40, and wireless node E has a DSA 45.

In the IR wireless LAN, it cannot be guaranteed that every network node that is part of the same wireless network can listen to all the network traffic. In FIG. 1, wireless node E can listen to the network data sent by wireless node B but not by wireless node C because wireless node E is within B's DSA 20, but is outside C's DSA 30. In this case, C is a hidden node with respect to E. Similarly C is a hidden node with respect to E, because C is outside E's DSA.45.

In some situations, it is possible for one IR wireless node to receive data sent by another wireless node but not be able to send to that node. For example, a first node (not shown) would be able to listen to the network data sent by a second node (not shown), but the second node would not be able to receive the data sent by the first node. This situation is known as asymmetry.

To compensate for possible wireless transmission failure, wireless packet delivery systems usually require receiving nodes send a specific acknowledgement to the sending node, acknowledging the receipt of each data packet. For example if wireless node A sends a directed packet to wireless node B, B will in turn send a packet to A, acknowledging receipt of A's message. These acknowledgements are not normally required for packet delivery systems on wired LANs, due to the low failure rate of transmissions in such mediums.

Turning now to FIG. 2, the BSA of AP1 is illustrated by circle 60 whereas AP2 is shown as having BSA 70. Wireless nodes A, B and E are within the BSA 60 of AP1. Wireless node B is also within the BSA 70 of AP2, as is wireless node D. Wireless node C is not within range of either access point.

It should be noted that because node B is within range of both APs, the wired LAN will receive unwanted duplicated messages if both AP1 and AP2 resend a message from B to the wired LAN, and likewise, node B will receive unwanted duplicated messages if both AP1 and AP2 resend a message from the wired LAN to B.

To avoid such duplication the invention provides a switching mechanism for ensuring that no more than one AP will act for any particular wireless node, by ensuring that every wireless node is "associated" with no more than one AP.

Each wireless node determines which AP (assuming there is more than one in range) it will associate with. Furthermore, each wireless node determines whether it can transmit a message directly to its destination node, and it asks an AP to deliver the message if it cannot do so directly. Each AP determines whether it should resend a data packet from the wired LAN to the wireless node to which the packet is addressed. Each AP monitors the wired LAN data traffic for any data packets that are destined for (ie, addressed to) one of the AP's associated wireless nodes. If the AP hears such a data packet on the wired LAN, it intercepts the data packet and relays it to the wireless node.

Each wireless node must be aware of what other nodes are around it, so it will be able to decide whether it can send to them. Therefore, each wireless node monitors the wireless traffic, and maintains a table of the addresses of all wireless nodes it has overheard recently. We shall refer to this as the DSA table. If a node has overheard another node, then the other node's address is in its DSA table and it assumes it can transmit to that node (ie, it ignores asymmetry, at least initially). This table represents all of the other nodes within whose DSA the tracking node is. This is assumed (by ignoring asymmetry) to represent all nodes within the DSA of the tracking node.

In the preferred embodiment, each wireless node relies on overheard messages emanating from nearby nodes (including all acknowledgements) to construct its DSA table. Optionally, each wireless node can emit a beacon, which would automatically be overheard by all other nodes within its DSA.

Each wireless node also monitors the network traffic looking for data packets sent by an AP. To assist wireless nodes (especially nodes actually moving) in locating nearby APs, each AP of the preferred embodiment of the present invention will emit a beacon, at regular intervals, eg, every 20 seconds, identifying the APs wireless network address. In the preferred embodiment, each wireless node maintains a separate table, called an AP table, which lists the addresses of all APs it has overheard. Preferably, this table also stores other information, for example which AP has been heard most recently, most frequently, least frequently, etc. Alternatively, this information could be stored as part of the DSA table. Preferably, the wireless node can differentiate between data packets from APs and packets from other wireless nodes because a bit in the control field of a wireless data packet indicates whether the data packet originates from an AP. Alternatively, each AP is assigned a unique wireless network address with a common prefix for its wireless LAN connection. For example, the network address may be "IRAP001" where IRAP is a common prefix for all AP wireless network addresses. No wireless network node other than an AP is assigned that common prefix.

Each AP is also assigned a wired group network address for its wired LAN connection. The group address is used for sending "multicast" broadcasts. When a "multicast" message, a form of broadcast message, is sent to the AP group network address in the wired LAN, all APs, but only APs, receive that message. All other wired network nodes ignore that message.

When a wireless node overhears an AP, it will enter this AP into its AP table. The node also determines which of the APs in its AP table it will associate with. Examples include: associate if the table is empty (ie, the wireless node has just powered on, or just entered the vicinity of a wired LAN), or maintain association with the current AP until it can no longer hear that AP, or associate with the AP heard most frequently, etc.

If the procedure indicates the wireless node should associate with the AP, the wireless node will send an association request data packet to the AP. If the association request data packet is sent successfully to the AP, ie, acknowledged by the AP, the wireless network node considers itself associated with that AP. The association request includes the wireless network address of the wireless node. Preferably, the request also indicates which AP, if any, the wireless node was previously associated with.

Each AP maintains a table, called its (Basic Service Set) BSS table, of all wireless nodes which it is associated with. After receiving the association request successfully from the wireless node, the AP adds the network node address to its BSS table. The AP can be configured so that if the association request indicates the wireless network node was associated with another AP previously, the AP sends a disassociate data packet to the previous AP via the wired LAN to the previously associated AP telling the AP to disassociate with the wireless node. Alternatively, once a wireless node associates with a new AP, it can instruct this AP to send such a disassociate request to the previous AP.

After receiving the disassociate data packet from the new AP, the previous AP deletes the wireless network node address from its BSS table.

Optionally each AP can also maintain a separate BSA table, similar to the DSA table maintained by each wireless node, listing the node addresses of all wireless nodes within its BSA, regardless of whether they are associated with it.

A wireless node only accepts data packets sent by the AP it is associated with; it will discard all data packets sent by other APs. It will, of course, accept data packets that are destined for it which are sent by other wireless nodes.

As stated, the selection of which AP will be associated with each wireless node is determined by each wireless node. Therefore, each AP accepts all data packets sent by any wireless node. If the AP receives a data packet directed to it by a wireless node that it is not associated with, the AP considers the data packet as an implicit association request. It adds the wireless node address to its BSS table and relay the data packet onto the wired LAN.

If a wireless node fails to send a data packet to its associated AP successfully, ie, the AP fails to acknowledge receipt of the data packet, the wireless node considers its wireless connection with the AP broken. It will delete its association with that AP. It then checks its AP table to see if another AP is available. If there is one, it will attempt to establish an association with that AP. If there is more than one, the AP will preferably select the AP heard most recently.

Similarly, if the AP fails to send a data packet successfully to the wireless node that is associated with it, it considers its wireless connection with the wireless node broken, and deletes the node from its BSS table.

In operation, when a wireless node (the sending node) is ready to send a data packet to another network node (the destination node), it first determines whether the network node address of the destination node is in its DSA table. If it is, this implies that the destination node is another wireless node within the DSA of the sending node. The sending node therefore sends the data packet to the other wireless node directly. If the destination node is not within the DSA table, the sending node sends the data packet to the AP it is associated with and asks the AP to help deliver the data packet to the destination node.

After receiving the data packet, the AP checks the destination of the data packet against its BSS. If the destination node is within its BSS (ie, if the destination node is also associated with the AP), the AP sends the data packet to the destination node directly via the wireless medium.

Otherwise, the AP resends the data packet onto the wired LAN. If the destination node is a wired node, it will receive the data packet directly. If the destination node is on another wireless LAN which is attached to the same wired LAN by another AP (ie, the destination node is a wireless node associated with another AP), the other AP will relay the data packet to that destination node.

Figure 3:
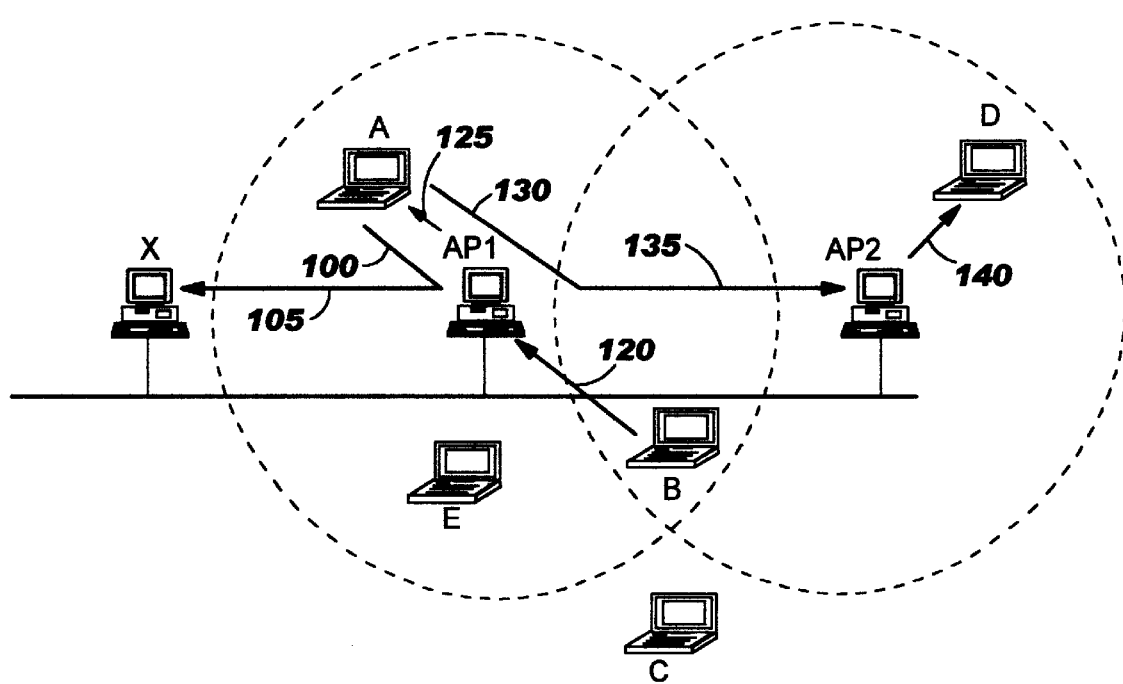
FIG. 3 illustrates schematically, for the same configuration as is shown in FIG. 2, how the preferred embodiment of the present invention is used to relay a message from B to A, from A to D and from A to X.

FIG. 3 shows three examples of how the preferred embodiment works. Assume wireless network node A has just entered the BSA of AP1. We will assume A has not been associated with any AP before. When it hears AP1's beacon, or alteratively, hears some data traffic from AP1 to wireless network node B, node A sends an association request data packet to AP1. After sending the association request data packet successfully (ie, receiving AP1's acknowledgement), A considers itself associated with AP1. After receiving the association request data packet successfully, AP1 adds A to its BSS table. It also sends a disassociation data packet on the wired LAN, advising any previously associated AP that AP1 is now associated with node A and that the previous AP should disassociate. This can be done by way of multicast or by a directed packet to the AP A was actually associated with.

Let us assume A wants to send a data packet to wired network node X. A first consults its DSA table to see if X is a wireless node within range. Since X is not in A's DSA, A sends the data packet to AP1 as is shown by arrow 100 in FIG. 3. AP1 then consults its BSS table to determine whether X is an associated wireless node within its BSA. Since X is not so listed, AP1 in turn resends the data packet onto the wired LAN, as is shown by arrow 105.

Let us further assume that after X receives the data packet, it sends a response data packet back to A. AP1 monitors the wired LAN data traffic and overhears a data packet destined for A, which is in its BSS. AP1 intercepts the data packet and sends it to A via the wireless medium.

Let us now assume both nodes A and B are associated with AP1, i.e., they both are in AP1's BSS, and node B wants to send a data packet to A. Node B examines its DSA to see if A is within range. As can be seen in FIG. 1, node B is not within the DSA 10 of node A, nor is node A within the DSA 20 of node B. In other words, the nodes are hidden from each other, even though both are within range of AP1. Direct wireless communication between the two nodes is not possible. Therefore, B sends the data packet to AP1 asking it to help deliver the data packet, as is shown by arrow 120 in FIG. 3. AP1 examines its BSS and determines A is associated with it. Therefore, AP1 transmits the data packet by the wireless medium to A, as is shown by arrow 125. It should be noted that even though node B is also within the BSA of AP2, node B is associated with AP1 and therefore does not ask AP2 for assistance.

Now let us assume node A wants to send a data packet to node D, which is associated with AP2. Since node D is not within node A's DSA, A sends the packet to AP1, as is shown by arrow 130. Since node D is not associated with AP1, AP1 resends the data packet onto the wired LAN, as is shown by arrow 135. AP2 overhears this data packet, determines that node D is associated with it, and resends the data packet directly to D, as is shown by arrow 140.

Note that node B is within the BSA of both AP1 and AP2. If node B had been associated with AP2 (and therefore would not have been associated with AP1), and wireless node A sends a data packet to wireless node B, then AP1 would not have transmitted the data packet directly to B, but rather, would have resent it on the wired LAN. In this circumstance, AP2 would intercept the data packet and resend it to B (because B would be in AP2's BSS table), as it would for node D.

Figure 4:
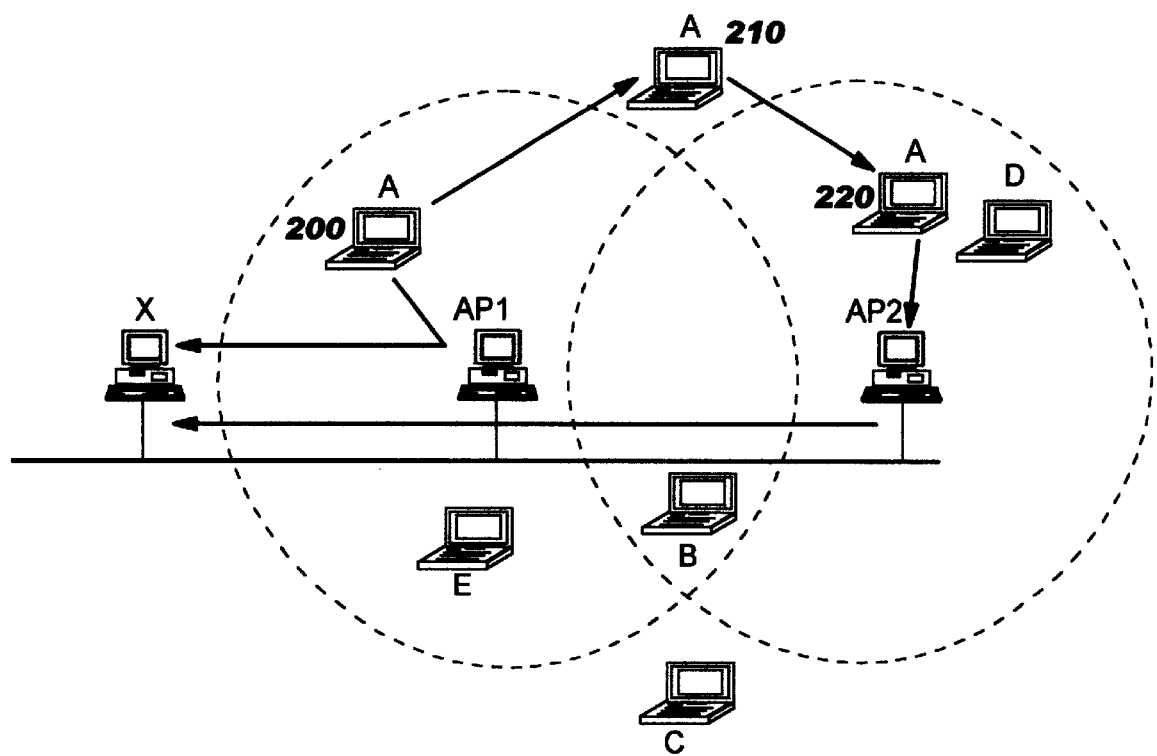
FIG. 4 illustrates schematically, for the same initial configuration as is shown in FIG. 2, node A roaming from the BSA of AP1 to the BSA of AP2.

FIG. 4 illustrates how a roaming wireless node can move in and out of different APs' BSAs. When a wireless node moves between BSAs of APs, it disassociates with one AP and associates with another. The data packets sent by the wireless network node to the wired LAN are resent by different APs depending on where the wireless node is, and which AP the wireless node associates itself with. Likewise, data packets destined for the wireless node are resent by different APs depending on where the wireless node is and which AP the wireless node associates itself with. This procedure will now be described.

When an node roams, it may roam out of range from all APs in its AP table. The wireless node is then disconnected from the wired LAN until it comes within range of another AP and associates itself with that AP. Of course a roaming node cannot associate itself with an AP until it becomes aware of the presence of that AP (ie, overhears either the AP's beacon or a regular transmission). Optionally, to shorten the time between the wireless network node moving into an AP's BSA and detecting the AP's existence, each AP can broadcast its beacon earlier when it first detects a wireless node. To do this, the AP maintains a BSA table, in addition to its BSS table, as described above. Alternatively it combines the two into an expanded BSA table, with an additional column identifying whether each wireless node listed is associated with it. If an AP overhears a wireless node which is not listed in its BSA table, the AP generates its beacon ahead of schedule. The AP detects the existence of the wireless node by overhearing a data packet, usually a broadcast packet, sent by the wireless node. This broadcast packet is usually generated in response to the upper layer network operating system trying to determine which other nodes are present in the network. The result of this broadcast packet emitted by a wireless network node is an early scheduled beacon emitted by the AP, which in turn starts the association process.

Referring to FIG. 4 for example, assume wireless node A is originally located at position 200, and is associated with AP1. It therefore communicates with wired network node X via AP1. As A moves to an area which is not covered by any AP, as is illustrated as position 210, it cannot receive acknowledgements from AP1 for any packets which it sends via AP1 to X. It thus ceases to consider itself associated with AP1 as it cannot communicate with AP1 any more. As A moves into AP2's BSA, as shown at 220, it recognizes the existence of AP2 either by observing AP2's beacon or AP2's data traffic. It is possible AP2 would overhear node A before A overhears AP2. In this case, as AP2 would not have heard A at either position 200, or 210, AP2 can optionally recognize that A is a node previously unheard by it, and emit its beacon early. In any of these events, A initiates an association process with AP2. This reconnects A to the network, allowing A to communicate with X again. Assuming an entire area is sufficiently covered by APs, A can move around the area while remaining connected to the network.

Figure 5:
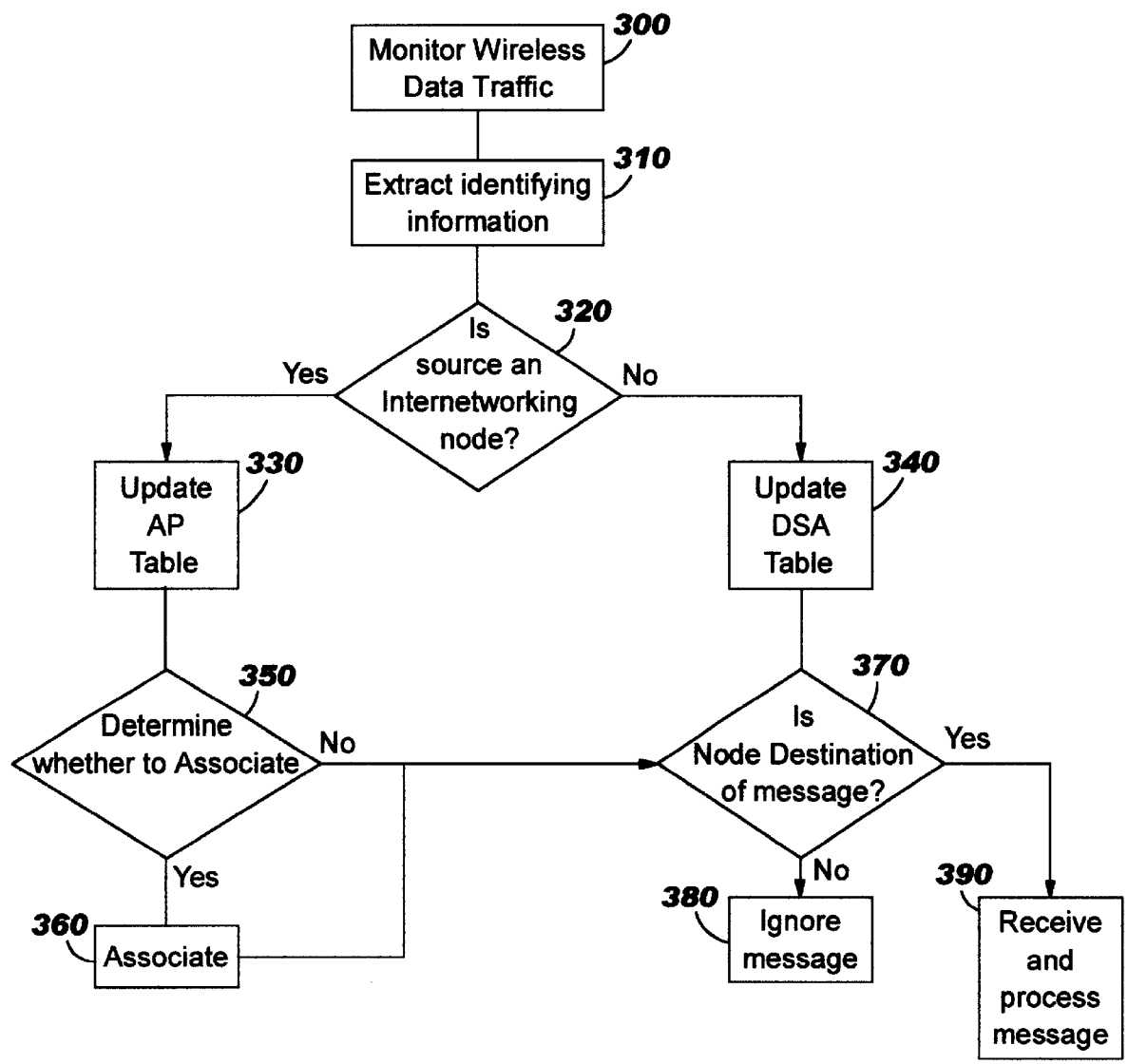
FIG. 5 is a flow chart illustrating the steps taken by a wireless node in receiving wireless data traffic according to the preferred embodiment of the present invention.
Figure 6:
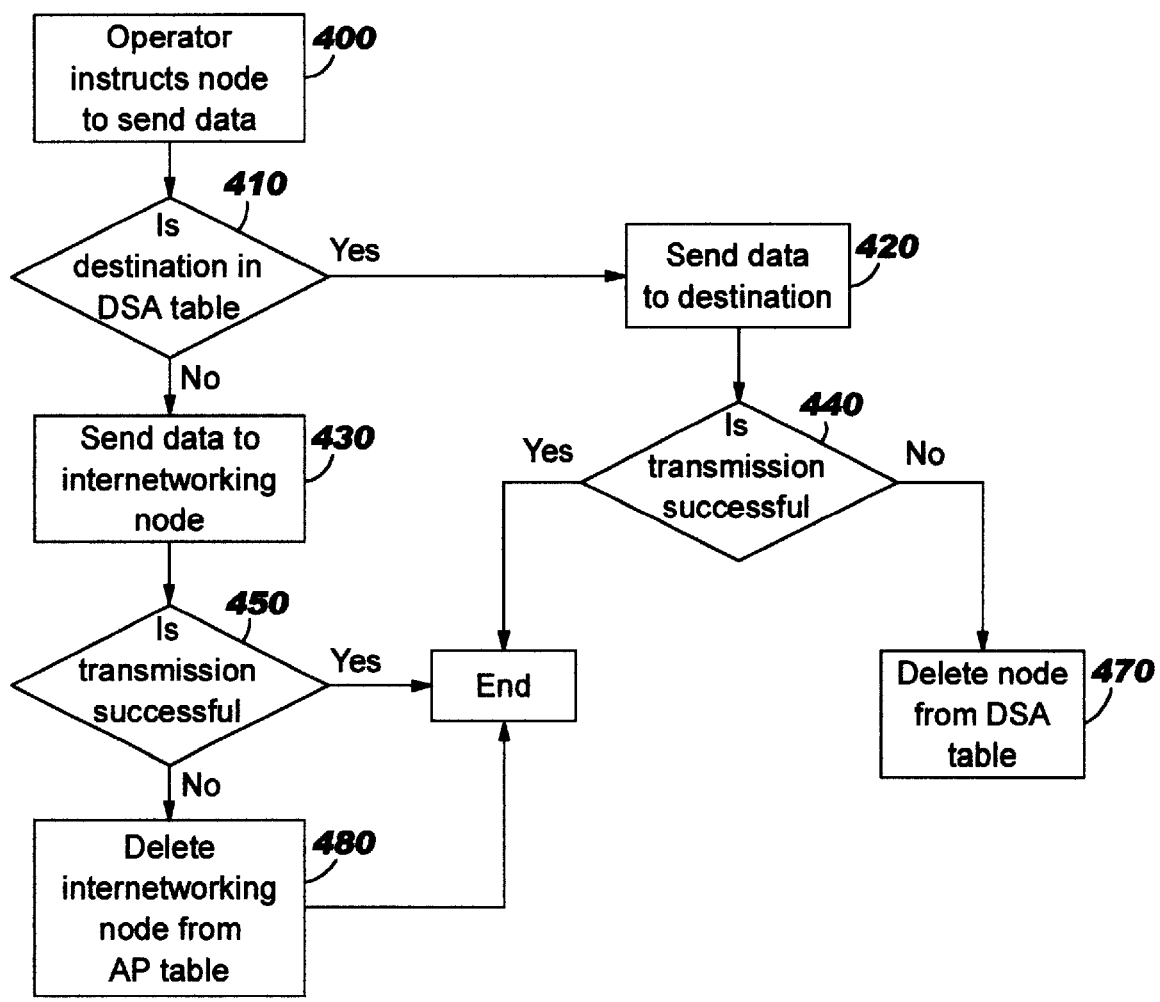
FIG. 6 is a flow chart illustrating the steps taken by a wireless node in sending data via wireless transmission according to the preferred embodiment of the present invention.

FIGS. 5 and 6 are flow charts illustrating the operating of a wireless node of the preferred embodiment of the present invention. FIG. 5 shows the message monitoring and receiving operations. As shown at step 300, a wireless node monitors all wireless data traffic within range. If it receives any messages, it extracts the identifying information contained within the message, as shown at step 310, in order to determine the network address of the source of the message. As shown at step 320 the wireless node evaluates whether the source node is an internetworking node, in which case the wireless node updates its AP table (step 330), or if the source is another wireless node, it updates its DSA table (step 340). If the source is an internetworking node, the wireless node determines whether or not it should associate as discussed above (step 350). If the wireless node is not currently associated with an internetworking node it will then associate with the internetworking node, (step 360).

After updating the appropriate table, the wireless node determines whether it is the destination of the message as shown at step 370. If it is the destination, it receives and processes the message at step 390. If it is not the destination, it ignores the message (step 380).

FIG. 6 illustrates the steps taken by a wireless node in response to a command from the operator for the node to send data as shown by step 400. First, as shown at step 410, the node determines whether the destination is in its DSA table. If it is in its DSA table it then sends the data to the destination as shown at step 420. As shown at step 440 the node determines whether the transmission is successful (by receiving a confirmation from the destination node). If the transmission is not successful (implying that the destination is no longer within range), the node deletes the destination node from its DSA table as shown at step 470. If the destination is not in the node's DSA table, the node sends the data to the internetworking node (AP) associated with it, as shown at step 430, and relies on the associated AP to forward the message. At step 450 the node determines whether its transmission to the AP is successful. If not, it deletes the internetworking node from its AP table as shown at step 480. If the node receives confirmation that its transmission was successful, then this ends the procedure, assuming that no additional packets of data need to be sent.

Figure 7:
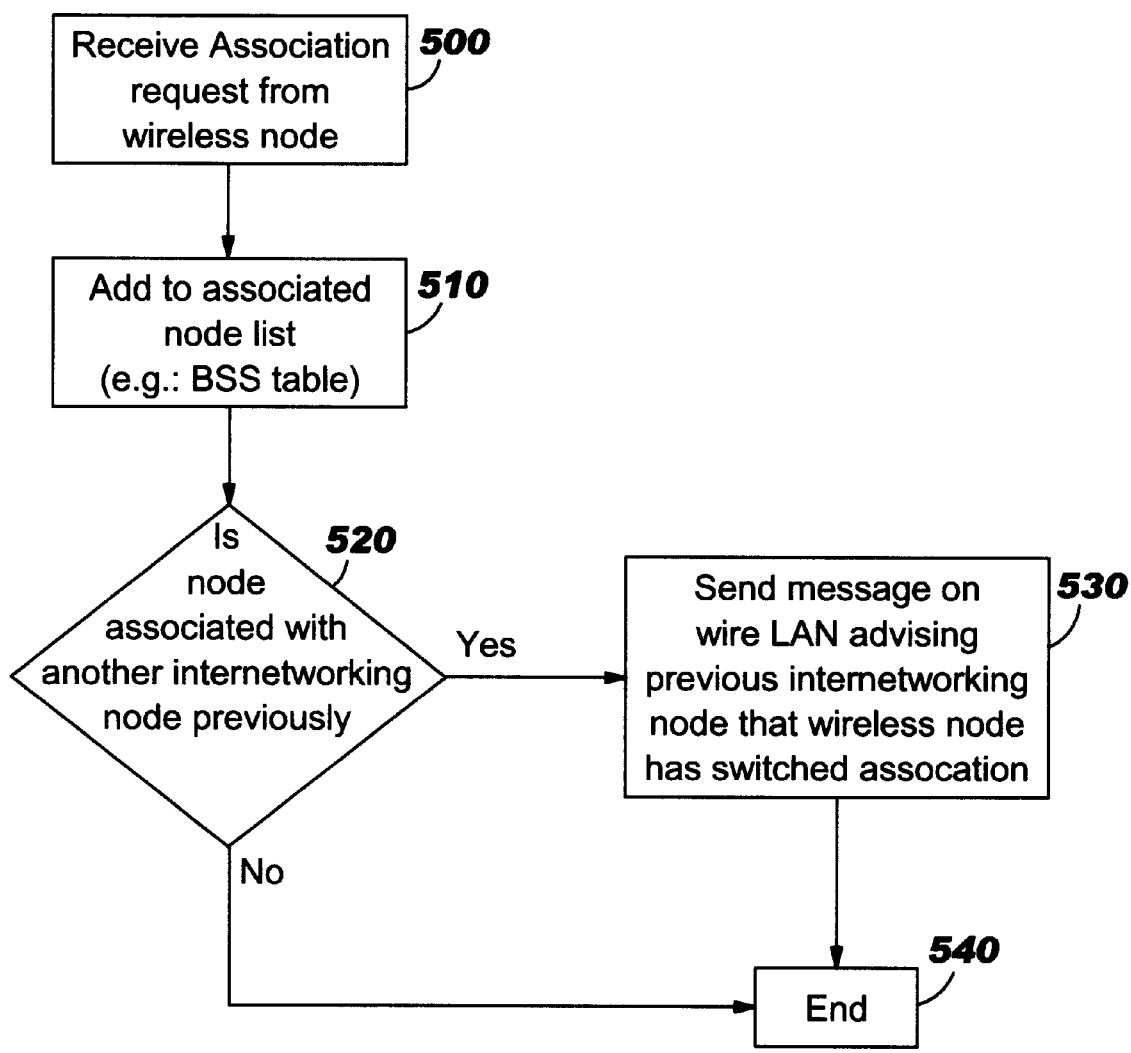
FIG. 7 is a flow chart illustrating how an internetworking node responds to an association request from a wireless node according to the preferred embodiment of the present invention.
Figure 8:
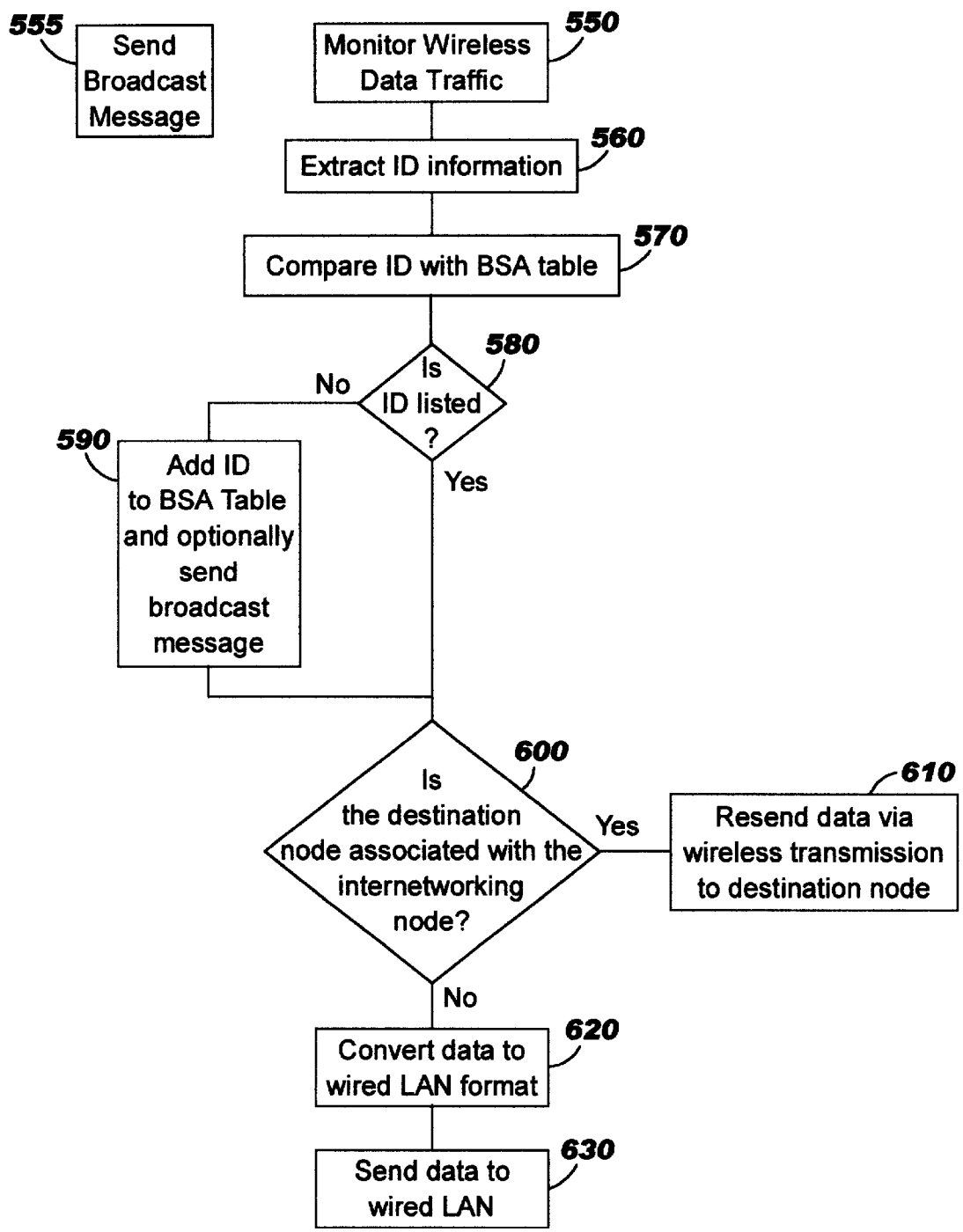
FIG. 8 is a flow chart illustrating the steps taken by an internetworking node (AP) upon receiving wireless data according to the preferred embodiment of the present invention.
Figure 9:
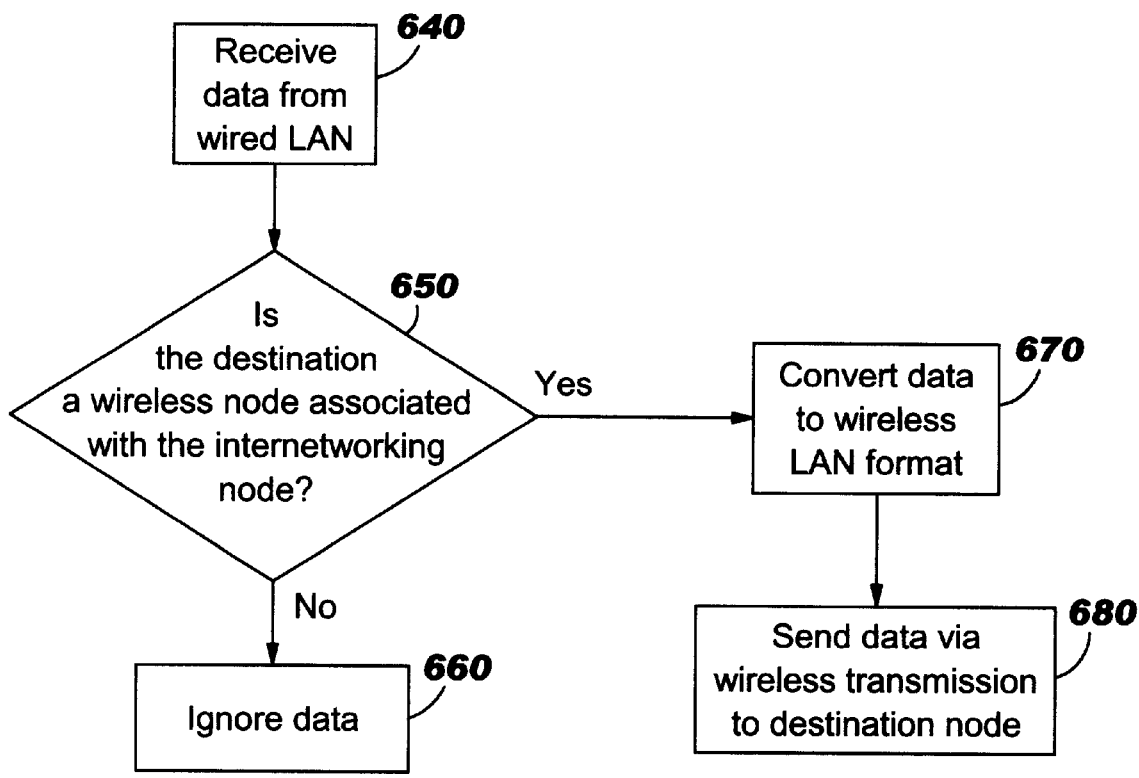
FIG. 9 is a flow chart illustrating how an internetworking node (AP) responds to receiving data from the wired LAN according to the preferred embodiment of the present invention.

FIGS. 7 through 9 illustrate the steps taken by an internetworking node according to the preferred embodiment of the present invention. FIG. 7 illustrates the steps taken when an internetworking node receives an association request from a wireless node as shown at step 500. The AP adds the requesting node to its associated node list (eg. its BSS table) as shown at 510. The AP then evaluates at step 520 whether the requesting node was previously associated with another internetworking node. If so, it broadcasts at step 530 a message on the wired LAN advising the previous internetworking node that the wireless node has switched association.

FIG. 8 is a flow chart illustrating the steps taken by an internetworking node upon receiving wireless data. The internetworking node monitors the wireless data traffic for any messages (step 550) periodically, it also issues a broadcast (step 555). Upon receipt of any wireless messages, the internetworking node extracts the identifying information from the message (step 560), and compares this identifying information with the list of wireless nodes it maintains in its BSA table (step 570). If the message is from a wireless node which is not listed in its BSA table the internetworking node adds the address of this wireless node (step 590). Optionally the internetworking node can send a broadcast message at this stage in order to notify the wireless node that it is now in range of the internetworking node. The internetworking node then determines whether the destination of the message is a wireless node associated with the internetworking node at step 600. If it is then the internetworking node resends the message via wireless transmission to the destination node, as shown at step 610. If the destination node is not associated with the internetworking node then the internetworking node converts the message to a format which can be transmitted on the wired LAN (step 620) and transmits the message on the wire LAN step 630.

FIG. 9 is a flow chart illustrating the steps taken by an internetworking node upon receiving data from the wired LAN (step 640). The internetworking node then determines whether the destination of this message is a wireless node associated with the internetworking node (step 650). If it is, then the internetworking node converts the message to a wireless format and transmits the message to the destination node as shown at steps 670 and 680. Otherwise the internetworking node ignores the message (step 660).

Figure 10:
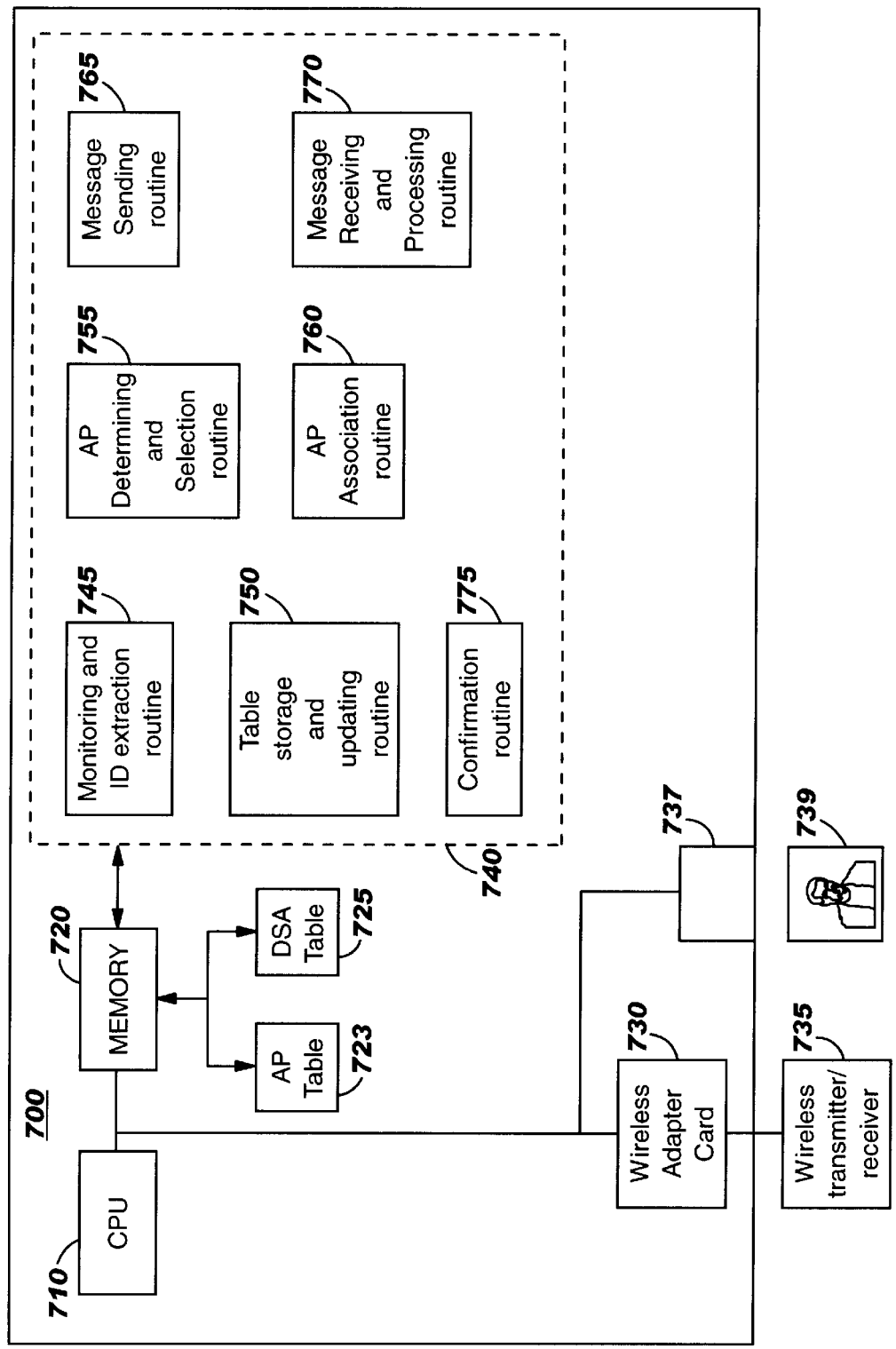
FIG. 10 is a block diagram illustrating the components of a wireless node according to the preferred embodiment of the present invention.

FIG. 10 is a block diagram schematically illustrating the components of a wireless node of the preferred embodiment of the present invention and its associated software which carry out the above described operations. A wireless node 700 can take the form of a laptop computer equipped with a wireless adapter card 730 and a wireless transmitter/receiver 735. The wireless adapter card/transmitter/receiver is controlled by a CPU 710 which in turn carries out instructions from the various software routines selected from those within phantom box 740 which are loaded into the node's memory 720. The node's memory 720 also maintains the AP table 723 and the DSA table 725. The software routines 740 include a monitoring and identifying information extraction routine 745 for carrying out steps 300 and 310; a table storage and updating routine 750 for maintaining and updating AP table 723 and the DSA table 725; an AP determining and selection routine 755 for accessing the AP table and determining the number of internetworking nodes for which the table contains identifying information, and selecting from that table an internetworking node to associate with; an AP association routine 760 for associating with the selected internetworking node; a message sending routine 765; a message receiving and processing routine 770; and a confirmation routine 775. Alternatively, suitable circuitry for carrying out similar operations can replace these software routines.

Figure 11:
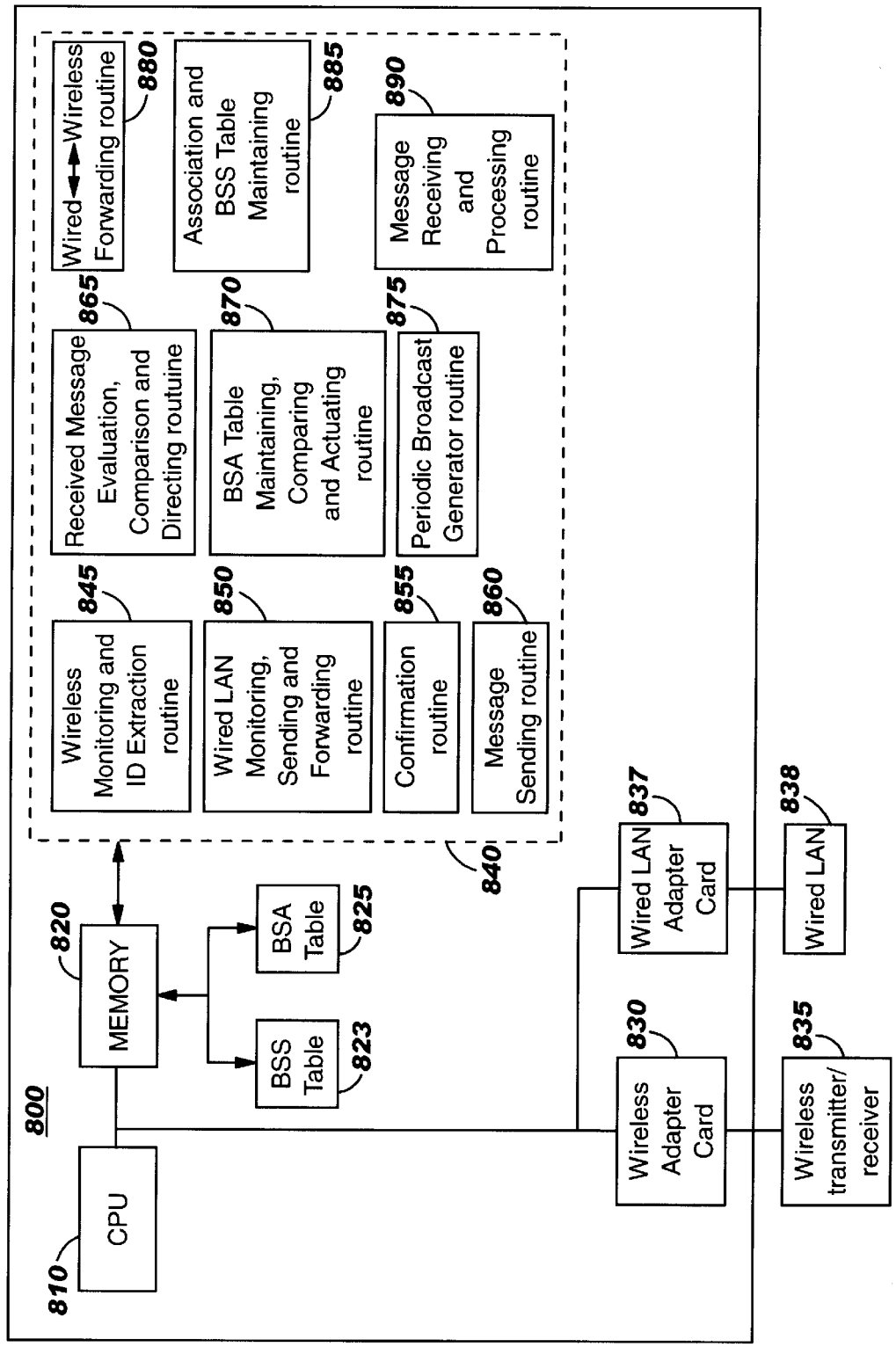
FIG. 11 is a block diagram illustrating the components of an internetworking node according to the preferred embodiment of the present invention.

FIG. 11 is a block diagram schematically illustrating the components of an internetworking node of the preferred embodiment of the present invention and its associated software which carry out the above described operations. An internetworking node can take the form of a desktop computer equipped with a wireless adapter card 830 and a wireless transmitter/receiver 835 along with a wired LAN adapter card 837 for communicating with a wired LAN 838. Both the wireless and wired adapter cards are controlled by a CPU 810, which in turn carries out instructions from the various software routines selected from those within phantom box 840 which are loaded into the node's memory 820. The node's memory 820 also maintains the BSS table 823 and the BSA table 825. The software routines 840 include a monitoring an identifying information extraction routine 845 which carry out steps 550 and 560; a wired LAN monitoring, sending and forwarding routine 850; a confirmation routine 855; a message sending routine 860; a received message evaluation, comparison and directing routine 865 for evaluating whether a message is to be forwarded to a specific other node and determining whether such specific other node is associated with the internetworking node, and if so, for resending the message via wireless transmission, and if not, then for resending the message on the wired LAN; a BSA table maintaining, comparing and actuating routine 870 for maintaining the BSA table of all nodes from which messages have been overheard within a specified interval, and adding any newly overheard node to the BSA table, said routine optionally causing the node to broadcast its beacon; a periodic broadcast generator routine 875 for causing the internetworking node to periodically broadcast a beacon; a wired/wireless forwarding routine 880 for resending wireless messages onto the wired LAN and vice versa; an association and BSS table maintaining routine for maintaining a table of all wireless nodes associated with the internetworking node; and a message receiving and processing routine 890. Alternatively, suitable circuitry for carrying out similar operations can replace these software routines.

It will be apparent that many other changes may be made to the illustrative embodiments, while falling within the scope of the invention and it is intended that all such changes be covered by the claims appended hereto.

What is claimed is:

1. A method for communicating within a network comprising the steps of:

(a) receiving in a wireless node not connected by wire to a wired network wireless data traffic;
(b) examining the wireless data traffic;
(c) extracting from said wireless data traffic information identifying a source node for the data traffic and storing the information identifying the wireless node in one of a first or second table;
(d) if the source node for the data traffic is a wireless node not connected by wire to a wired network, storing the information identifying the wireless node in a first table;
(e) receiving in said wireless node not connected by wire to a wired network a command to send data to a destination node;
(f) correlating information identifying the destination node with contents of the first table;
(g) if a match occurs directly forwarding the data to the destination node wherein peer-to-peer communication between the receiving wireless node not connected by wire to a wired network and a destination wireless node not connected by wire to a wired network is being effectuated without using a node that is connected by wire to a wired network.

2. The method of claim 1 further including the steps of:
(j) the source node for the data traffic is an inter-networking node, storing information identifying the inter-networking node in a second table;
(k) if a match does not occur between an entry in the first table and the information identifying the destination node (step f) forwarding the data to the inter-networking node.

3. A method for communicating within a network comprising the steps of:
(a) receiving in a wireless node not connected by wire to a wired network wireless data traffic;
(b) examining the wireless data traffic;
(c) extracting from said wireless data traffic information identifying a source node for the data traffic;
(d) if the source node for the data traffic is a wireless node not connected by wire to a wired network, storing the information identifying the wireless node in a first table;
(e) receiving in said wireless node not connected by wire to a wired network a command to send data to a destination node;
(f) correlating information identifying the destination node with contents of the first table;
(g) if a match occurs directly forwarding the data to the destination node wherein peer-to-peer communication is effectuated between the wireless node and a wireless destination node not connected to a wired network;
(h) receiving in said wireless node a message from the wireless destination node acknowledging receipt of the data; and
(i) deleting information identifying the wireless destination node from the first table if the acknowledgment was not received.

4. A method for communicating within a network comprising the steps of:
(a) receiving in a wireless node not connected by wire to a wired network wireless data traffic;
(b) examining the wireless data traffic;
(c) extracting from said wireless data traffic information identifying a source node for the data traffic;
(d) if the source node for the data traffic is a wireless node not connected by wire to a wired network, storing the information identifying the wireless node in a first table;
(e) receiving in said wireless node not connected by wire to a wired network a command to send data to a destination node;
(f) correlating information identifying the destination node with contents of the first table; and
(g) if a match occurs directly forwarding the data to the destination node wherein peer-to-peer communication is effectuated between the wireless node and a wireless destination node not connected to a wired network;
(h) if the source node for the data traffic is an inter-networking node, storing information identifying the inter-networking node in a second table;
(i) if a match does not occur between an entry in the first table and the information identifying the destination node (step f) forwarding the data to the inter-networking node;
(j) receiving in said wireless node a message from the inter-networking node acknowledging receipt of the data; and
deleting the information identifying the internetworking node if acknowledgment is not received.

5. A method for communicating within a network comprising the steps of:
(m) receiving in a wireless node not connected by wire to a wired network wireless data traffic;
(n) examining the wireless data traffic;
(o) extracting from said wireless data traffic information identifying a source node for the data traffic;
(p) if the source node for the data traffic is a wireless node not connected by wire to a wired network, storing the information identifying the wireless node in a first table;
if the source node for the data traffic is an internetworking node, storing the information identifying the internetworking node in a second table;
(q) receiving in said wireless node a command to send data to a destination node;
if the address of the destination node address matches an entry in the first table, the destination node is wireless not connected by wire to a wired network, forwarding the data directly to the wireless destination node; and
sending the data to an internetwork node if the address of the destination node is not in the first table.

6. The method of claim 5 further including the steps of establishing association with an internetworking node if information identifying more than one internetworking nodes are recorded in the second table.

7. A wireless node for communicating in a network comprising:
a wireless adapter card with no attachment by wire to wired networks that receives and transmits wireless information;
a memory;
a first table to store addresses of wireless nodes not connected by wire to wired network;
a second table to store addresses of inter-networking nodes;
a set of software routines store in said memory; and
a controller operatively coupled to the wireless adapter card and the memory, said controller accessing the set of software routines and selecting ones which allow said controller to send a message directly to another wireless node not connected by wire to a wired network having an address in the first table and to an internetworking node having an address in the second table if the address of the wireless node not connected by wire to a wired network is not known.

8. The wireless node of claim 7 wherein the software routines are implemented in hardware logic circuits.

9. The wireless node of claim 7 wherein the software routine includes:

a monitoring and identifying information extraction routine for monitoring wireless data traffic and extracting identifying information, a table storage and updating routine that maintains and updates the first table and the second table and an internetworking and selection routine that accesses the second table to determine the number of internetworking nodes in said second table and selecting from the second table the internetworking node to associate with.

10. The wireless node of claim 9 wherein the software routine further includes a message sending routine, a message receiving and processing routine, a confirmation routine and an association routine for establishing association between the wireless node and the selected internetworking node.

11. The wireless node of claim 7 further including an Input/Output adapter, operatively coupled to the controller, to receive and output user information.

12. A computer program product comprising:

a recording medium;

a computer program recorded on said recording medium;

said computer program including

A instructions that monitor wireless data traffic and extract addresses for nodes contained in said data traffic;

instructions that sort extracted addresses into addresses for wireless node not connected by wire to a wired network and addresses for internetworking node; and instructions that use the sorted information to route data directly between wireless nodes not connected by wire to wired network if an address of the wireless node is known and to a networking node if the address of the node is unknown.

13. The computer program product of claim 12 further including instructions that modify the addresses for wireless node and addresses for internetworking node in response to received information;

instructions that count the number of addresses for internetworking node and establishing association between a selected one of the internetworking node and a wireless node.

14. The computer program product of claim 13 further including instructions that prepare and forward messages.

15. A method for communicating within a network comprising the steps of:

(a) receiving in a wireless node wireless data traffic;

(b) examining the wireless data traffic;

(c) extracting from said wireless data traffic information identifying a source node for the data traffic;

(d) if the source node for the data traffic is a wireless node, storing the information identifying the wireless node in a first table;

(e) receiving in said wireless node a command to send data to a destination node;

(f) correlating information identifying the destination node with contents of the first table;

(g) if a match occurs directly forwarding the data to the destination node wherein peer-to-peer communication is effectuated between the wireless node and a wireless destination node not connected to a wired network;

(h) receiving in said wireless node not connected to a wired network a message from the wireless destination node acknowledging receipt of the data; and (i) deleting information identifying the wireless destination node from the first table if the acknowledgment was not received.

16. A method for communicating within a network comprising the steps of:

(a) receiving in a wireless node wireless data traffic;

(b) examining the wireless data traffic;

(c) extracting from said wireless data traffic information identifying a source node for the data traffic;

(d) if the source node for the data traffic is a wireless node, storing the information identifying the wireless node in a first table;

(e) receiving in said wireless node a command to send data to a destination node;

(f) correlating information identifying the destination node with contents of the first table;

(g) if a match occurs directly forwarding the data to the destination node wherein peer-to-peer communication is effectuated between the wireless node and a wireless destination node not connected to a wired network;

(h) if the source node for the data traffic is an internetworking node, storing information identifying the inter-networking node in a second table;

(i) if a match does not occur between an entry in the first table and the information identifying the destination node (step f) forwarding the data to the inter-networking node;

(j) receiving in said wireless node a message from the inter-networking node acknowledging receipt of the data; and deleting the information identifying the internetworking node if acknowledgment is not received.

* * * * *

UNITED STATES PATENT AND TRADEMARK OFFICE
CERTIFICATE OF CORRECTION

PATENT NO. : 6,549,786 B2
DATED : April 15, 2003
INVENTOR(S) : Cheung et al.

It is certified that error appears in the above-identified patent and that said Letters Patent is hereby corrected as shown below:

<u>Title page,</u>
Item [22], replace "Filed:  May 25, 1998" with -- Filed:  May 22, 1998 --

Signed and Sealed this

Thirteenth Day of April, 2004

JON W. DUDAS
*Acting Director of the United States Patent and Trademark Office*